US007017173B1

(12) United States Patent
Armstrong et al.

(10) Patent No.: US 7,017,173 B1
(45) Date of Patent: Mar. 21, 2006

(54) SYSTEM ENABLING USER ACCESS TO SECONDARY CONTENT ASSOCIATED WITH A PRIMARY CONTENT STREAM

(75) Inventors: James B. Armstrong, Princeton, NJ (US); Craig T. Jorgensen, Haddonfield, NJ (US)

(73) Assignee: Sedna Patent Services, LLC, Philadelphia, PA (US)

( * ) Notice: Subject to any disclaimer, the term of this patent is extended or adjusted under 35 U.S.C. 154(b) by 597 days.

(21) Appl. No.: 09/538,816

(22) Filed: Mar. 30, 2000

Related U.S. Application Data (66) Substitute for application No. 60/126,834, filed on Mar. 30, 1999.

(51) Int. Cl.
*H04N 7/173* (2006.01)
(52) U.S. Cl. .......................... 725/87; 725/88; 725/136
(58) Field of Classification Search .................. 725/88, 725/89, 90, 102, 1, 87; 386/46, 125, 126, 386/124
See application file for complete search history.

(56) References Cited

U.S. PATENT DOCUMENTS

| | | | |
|---|---|---|---|
| 5,233,423 A | 8/1993 | Jernigan et al. ............ 358/181 |
| 5,563,648 A | 10/1996 | Menand et al. ............... 348/13 |
| 5,583,563 A | 12/1996 | Wanderscheid et al. ....... 348/13 |
| 5,724,521 A * | 3/1998 | Dedrick ....................... 705/26 |
| 5,729,280 A * | 3/1998 | Inoue et al. ................. 725/101 |
| 5,786,845 A | 7/1998 | Tsuria ........................... 348/9 |
| 5,826,166 A | 10/1998 | Brooks et al. ............... 455/5.1 |
| 6,002,394 A | 12/1999 | Schein et al. ............... 345/327 |
| 6,363,204 B1 * | 3/2002 | Johnson et al. ............... 386/46 |

FOREIGN PATENT DOCUMENTS

WO    WO 9848566 A2 * 10/1998

* cited by examiner

*Primary Examiner*—Chris Kelley
*Assistant Examiner*—Jamieson W. Fish
(74) *Attorney, Agent, or Firm*—Patterson & Sheridan LLP (57) ABSTRACT

The invention comprises a method and apparatus for inserting advertisement and/or other information into an audio-video presentation during the presentation of non-active imagery. More specifically, in a case of a user interrupting the standard presentation of a content stream via, for example, pressing a pause or stop button on a remote control device, the size of an image region presently displaying the interrupted content stream is reduced, and advertisement and/or other information is inserted into at least portions of the image region formerly occupied by the interrupted content imagery or overlayed onto the interrupted content imagery.

8 Claims, 6 Drawing Sheets

SYSTEM ENABLING USER ACCESS TO SECONDARY CONTENT ASSOCIATED WITH A PRIMARY CONTENT STREAM

CROSS-REFERENCE TO RELATED APPLICATIONS

This application claims benefit of U.S. provisional patent application Ser. No. 60/126,834 filed Mar. 30, 1999, which is hereby incorporated by reference in its entirety.

The invention relates to communication systems in general and, more specifically, the invention relates to an interactive information distribution system in which a secondary content stream associated with a primary content stream may be selected for presentation by a user.

BACKGROUND OF THE INVENTION

In several communication systems, the data to be transmitted is compressed so that the available bandwidth is used more efficiently. For example, the Moving Pictures Experts Group (MPEG) has promulgated several standards related to digital data delivery systems. The first, known as MPEG-1, refers to the ISO/IEC Standards 11172 and is incorporated herein by reference in its entirety. The second, known as MPEG-2, refers to the ISO/IEC standards 13818 and is incorporated herein by reference in its entirety. A compressed digital video system is described in the Advanced Television Systems Committee (ATSC) digital television standards document A/53, which is incorporated herein by reference in its entirety. The European standards known as the Digital Video Broadcasters (DVB) Standards provide functionality similar to that provided by the ATSC Systems. The DVB standards are incorporated herein by reference in their entirety.

Several interactive digital video on demand (VOD) services are known. For example a service known as the DIVA System is manufactured by DIVA Systems Corporation of Redwood City, Calif. The DIVA System distributes audio-visual information to individual subscribers utilizing MPEG-like information streams. Subscribers within the DIVA System utilize commercially-available interactive set-top boxes (STBs) to select desired content for viewing. Specifically, subscribers within the DIVA System interact with the set-top box via, for example, a remote control device to select movies, television programs, sporting events or other content streams for subsequent presentation on a display device connected to the set-top terminal. The subscriber selections are transmitted to the head end servicing the subscriber, where the requested content is then streamed to the subscriber. Another interactive VOD Service known as Pegasus has been described by Time-Warner, Inc. of New York City, N.Y.

The DIVA System advantageously offers video cassette recorder (VCR)-like functionality to subscribers. That is, subscribers utilize the well-known VCR-like functions of PAUSE, STOP, PLAY, FAST FORWARD, REWIND, FAST PLAY and the like. Thus, unlike traditional video on demand systems, the DIVA System enables a higher degree of subscriber control and, therefore, greater flexibility and added value.

During times when a user has interrupted a VOD presentation (e.g., via a STOP or PAUSE function), the user's display device typically presents a "freeze frame" or other similar display imagery. The inventors believe that this imagery may be put to greater uses.

Therefore, it is seen to be desirable to provide a method and apparatus for adapting screen imagery within the context of an interactive VOD system such that non-active imagery may be utilized for various additional purposes. Specifically, it is seen to be desirable to utilize at least a portion of a non-active image presentation for advertisement purposes and/or other purposes.

SUMMARY OF THE INVENTION

The invention comprises a method and apparatus for inserting advertisement and/or other information into an audio-video presentation during the presentation of non-active imagery. More specifically, in a case of a user interrupting the standard presentation of a content stream via, for example, pressing a pause or stop button on a remote control device, the size of an image region presently displaying the interrupted content stream is reduced, and advertisement and/or other information is inserted into at least portions of the image region formerly occupied by the interrupted content imagery or overlayed onto the interrupted content imagery.

BRIEF DESCRIPTION OF THE DRAWINGS

The teachings of the present invention can be readily understood by considering the following detailed description in conjunction with the accompanying drawings, in which.

DESCRIPTION OF THE EMBODIMENT

The invention will primarily be described in the context of the interactive video-on-demand (VOD) system known as the DIVA System. However, it will be appreciated by those skilled in the art that the teachings of the present invention may be readily applied to other interactive information distribution systems. Specifically, the teachings of the present invention are applicable to any interactive information distribution system in which a user may interrupt the presentation of a content stream such that advertisement information may be provided in place of the content stream during the interruption period.

The invention will be described within the context of an interactive information distribution system including information provider or server equipment and information consumer or user equipment. The information provider equipment provides content streams to the information consumer equipment in response to requests for the content streams. Information consumers may utilize a user input device such as a remote control device to effect a stop or pause command, to which the information provider equipment responsively halts the serving of the requested content stream. Upon halting the requested content stream, the information server equipment provides advertisement content in place of, or along with, still or moving imagery associated with the halted content stream.

The invention will also be described as providing advertisement content, advertising streams, secondary content and/or secondary streams. For purposes of the disclosure, all of these terms are intended to denote a secondary or non-primary content stream. A primary content stream comprises a content stream requested by a subscriber. The secondary content stream may comprise advertising, instructional videos, help screens (e.g., context sensitive help and the like), information pertaining to actors, locations, items, goods and/or services depicted in a scene within the primary content and similar information. The secondary content may comprise still or moving imagery, audio or non-audio information, text files, graphics files or any combination thereof. Broadly speaking, secondary content simply comprises an information bearing file.

Figure 1:
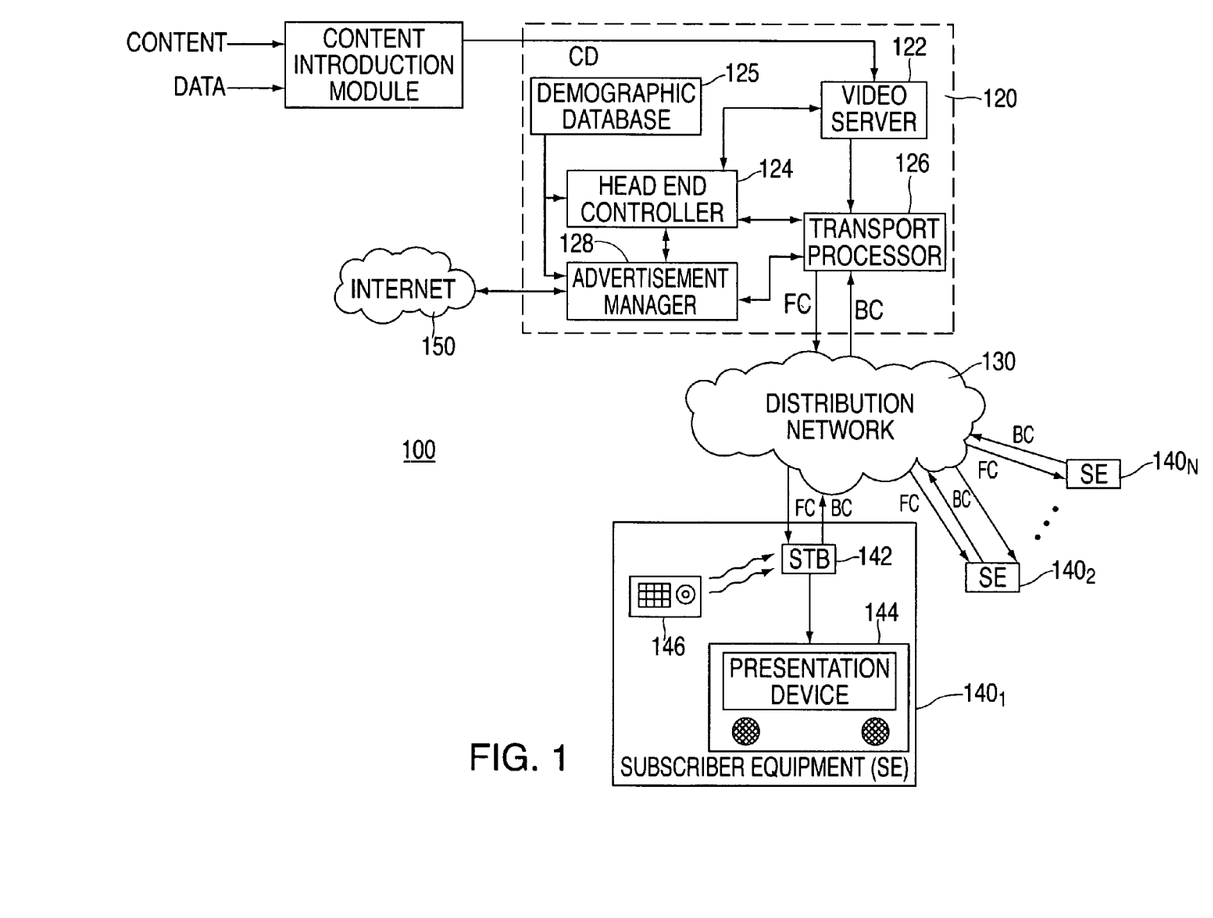
FIG. 1 depicts a high-level block diagram of an interactive information distribution system.

FIG. 1 depicts a high-level block diagram of an interactive information distribution system including the invention. Specifically, a cable system head end 120 interacts with a plurality of subscriber equipment 140₁ through 140ₙ via a forward channel FC and a back channel BC. The forward channel FC and back channel BC are implemented using a distribution network 130. The cable system head end receives subscriber requests for audio-visual programs by the back channel BC and responsively provides the requested audio-visual programs to the requesting subscriber via the forward channel FC. The cable system head end 120 also receives control commands from the subscriber equipment 140 via the back channel BC. Such control commands include video cassette recorder (VCR)-like commands such as STOP, PAUSE, FAST FORWARD, REWIND, FAST PLAY and the like.

In response to a received STOP or PAUSE command, the cable system head end terminates the streaming of the respective requested content stream to the subscriber equipment. The subscriber equipment may implement a "freeze-frame" function such that a presentation device associated with the subscriber equipment displays still imagery associated with the last video frame received. In response to a FAST FORWARD or REWIND command, the cable system head end is selected and FAST FORWARD or REWIND content stream associated with the normal play content stream provided to the subscriber. The selected FAST FORWARD or REWIND content stream is then provided to the requesting subscriber in place of the normal play content stream, thereby implementing the FAST FORWARD or REWIND function. Alternatively, only portions of the normal play content stream (such as l-frames) are provided to the subscriber in either a forward temporal order (FF) or a reverse temporal order (REW). It should be noted that any method of implementing a fast forward or rewind function may be used within the context of the present invention. The above FF/REW methods are provided for illustrative purposes only.

The subscriber equipment 140 comprises a set-top box (STB) 142, a presentation device 144 and a user input device such as a remote control device 146. The set-top box 142 receives content streams and control information from the cable system head end 120 via the forward channel FC. The set-top box transmits user commands and other control information to the cable system head end 120 via the back channel BC. The set-top box 142 receives user commands and other user interaction via the user input device 146. The set-top box 142 provides audio and video streams suitable for use by the presentation device 144. The presentation device 144 comprises, illustratively, a display device and audio presentation subsystem such as a television system.

The cable system head end 120 comprises a video server 122, a head end controller 124, a transport processor 126 and an advertisement manager 128. The head end 120 optionally includes a demographic data base 125 cooperating with one or both of the head end controller 124 and advertising manager 128.

The video server 122 comprises mass storage devices and other devices suitable for storing content streams. Content streams comprise, illustratively, compressed video streams and associated audio streams representing movies, television programs, sporting events advertisement and other "content." In addition, the video server 122 stores advertisement data associated with the respective content streams. The advertisement data may be stored as part of the content stream or as a separate data stream.

The advertisement manager 128 is depicted as a distinct functional element within the server equipment 120. However, it will be appreciated by those skilled in the art that the functions performed by the advertisement manager 128 may be incorporated into one or more other functional elements within the server equipment 120, such as the head-end controller 124 or the video server 122. As such, the following description of the advertisement manager 128 are equally applicable to embodiments of the invention in which the advertisement manager functions are incorporated into other functional elements within the server equipment 120.

The advertisement manager 128 comprises three primary functions; namely, a web portal function for receiving information from the Internet 150, a movie description file data base function and an advertisement data base function. The web portal function comprises the functionality necessary to retrieve, from the internet or other network, advertisement content streams, web pages, streaming media or other information available from the internet or other computer network. The retrieved advertisement information is provided directly to users, provided to the video server 122 or stored by the advertisement manager 128 for future use.

The movie descriptor file data base comprises a data base of the movie descriptor files associated with each of the content streams available to users via the video server 122. Specifically, a movie descriptor file comprises a file that delineates a content stream, such as a movie, according to scene changes or other parameters such that intra-scene content may be associated with corresponding advertisement information or content. For example, in one embodiment of the invention it is desirable to provide an advertisement stream or other advertisement content to a user based upon the stop or pause point of a content stream being provided to the user. The movie descriptor file data base comprises a data base in which a content stream such as a movie is divided into a plurality of (typically) non-uniform temporal portions where each temporal portion of scene has associated with it advertisement information. The advertisement information associated with each temporal portion or scene of a content stream is stored within the advertisement data base of the advertisement manager. By knowing the step or pause point, the movie descriptor file may be used to determine which scene or temporal portion includes the step or pause point. In this manner, the correct advertisement information may be determined.

The advertisement data base function comprises a data base in which advertisement information is stored. The advertisement information may be replenished and/or augmented or updated via the web portal directly from an advertiser's web site. In the case of advertisement information comprising advertisement content streams, such advertisement content streams may be stored on the video server 122. In this case, the advertisement data base function provides pointers or other addressing indicia from which the location of an advertisement stream to be provided to a user may be determined.

The advertisement data includes generalized advertisement information, advertisement information of goods and/or services presented in the content streams and the like. The advertisement content or data may be associated with content streams on a scene-by-scene basis such that goods and/or services included within each scene of a content stream (e.g., furniture, clothing, automobiles, food and the like presented within a scene of a movie) may be identified separately in the advertisement data stream. As previously discussed with respect to the movie descriptor file data base function and the advertisement data base function of the advertisement manager 128, the advertisements provided to a user are organized, for example, in a manner reflecting the use of the advertised goods and/or services within a scene or temporal portion of a content stream such as a movie. It will also be appreciated that each user within the interactive information distribution system 100 of FIG. 1 may be associated with demographic data that may be used to define appropriate advertisement content to be provided to the user.

Thus, in one embodiment of the invention, rather than providing advertisement content to a user based upon the stop or pause location within a content stream, the provided advertisement content comprises demographically appropriate advertisement content, regardless of the relationship to the advertised goods and/or services to a content stream being viewed by the user.

In still another embodiment of the invention, both demographic information and content-related information are used to determine the secondary content provided to the subscriber in response to a stop or pause command. Specifically, as previously discussed, a primary content stream is divided into a plurality of temporal segments or scenes, where each temporal segment or scene has associated with it a respective group of advertisement content or other secondary content. Additionally, the subscriber has associated with him or her a demographic profile indicative of, for example, household income, address, education level, buying preferences, responses given to previous inquiries regarding demographic information and other information relevant to a determination by an advertiser that a particular subscriber would or would not be a likely candidate for the goods and/or services of the advertiser. In this embodiment of the invention, the goods and/or services (or other secondary content) associated with the scene or temporal segment in which the subscriber invoked the stop or pause command are determined. Those goods and/or services or other secondary content that are also appropriate with respect to the demographic profile of the subscriber are used to determine which advertisement content or other secondary content will be provided to the subscriber. Thus, in this embodiment of the invention, the secondary content provided to the subscriber comprises demographically appropriate secondary content selected from the group of secondary content associated with the scene or temporal segment stopped or paused by the subscriber.

The use of advertisement data streams will be discussed in more detail with respect to FIGS. 2 through 4. Briefly, a user receiving a content stream, including associated advertisement data streams, may stop or pause and receive content stream. The set-top box 142, upon receiving the STOP or PAUSE command, causes the present frame to be "frozen" and decimated such that the frozen frame occupies only a portion of the display area of the presentation device. The set-top box 142 then extracts advertisement information associated with the presently displayed scene. The advertisement information presented on the display screen and a user operating the user input device 146 may select particular advertisements for subsequent presentation. In the case of a user selecting a particular advertisement for a presentation, a selection command is promulgated via the back channel to the cable system head end 120. The cable system head end 120 responsively retrieves the selected advertisement stream, web page or other information and provides that information to the requesting subscriber equipment via the forward channel FC for presentation to the requesting user.

The advertisement information may be included within the content stream, provided as a contemporaneous auxiliary stream, or provided by the server in response to the stop/pause command. The server may use the present scene context or the demographic data associated with the user to determine a specific advertisement information to provide.

The video server 122 couples content streams, advertisement streams and other streams to the transport processor 126. The transport processor 126 implements all the interface requirements associated with the distribution network 130. Specifically, the transport processor 126 accomplishes all the forward content channel transmission interface requirements of the system 100 of FIG. 1. The transport processor 126 is coupled to the subscriber network 140 via the forward channel FC and back channel BC. The forward channel FC is supported by the distribution network 130 and comprises a relatively high bandwidth communications channel well-suited to carrying video, audio and data such as, for example, multiplexed MPEG-2 transport packets. The forward channel may also comprise a high bandwidth channel for video data and a relatively low bandwidth channel for control data. In the system 100 of FIG. 1, the forward channel is used to provide both content and control information to the subscriber equipment 140. The back channel BC may comprise a lower bandwidth communication channel that is also supported by the distribution network 130.

The distribution network 130 can be any one of a number of conventional broadband communication networks that are available such as a fiber optic network, a telephone network, and existing cable television network and the like. For example, if the network is a hybrid fiber-coax network, the transmission transport technique used in both forward channels may be modeled after the Moving Pictures Expert Group (MPEG) transport protocol for the transmission of video data streams.

In response to a user request for a particular content file, the head end controller 124 causes the requested content file to be streamed to the transport processor 126 from the video server 122. Additionally, the head end controller 124 causes advertisement data associated with the requested content file to be streamed to the transport processor 126 from the video server 122 or the advertisement manager 128. The advertisement data comprises selectable objects that are displayed to a user upon the user interrupting the presentation of the content stream (e.g., pausing or stopping the presentation). The advertisement data may be carried as a separate data stream with its own program stream or within a transport stream including the content stream (i.e., a data stream having a unique packet identifier or PID).

Figure 2:
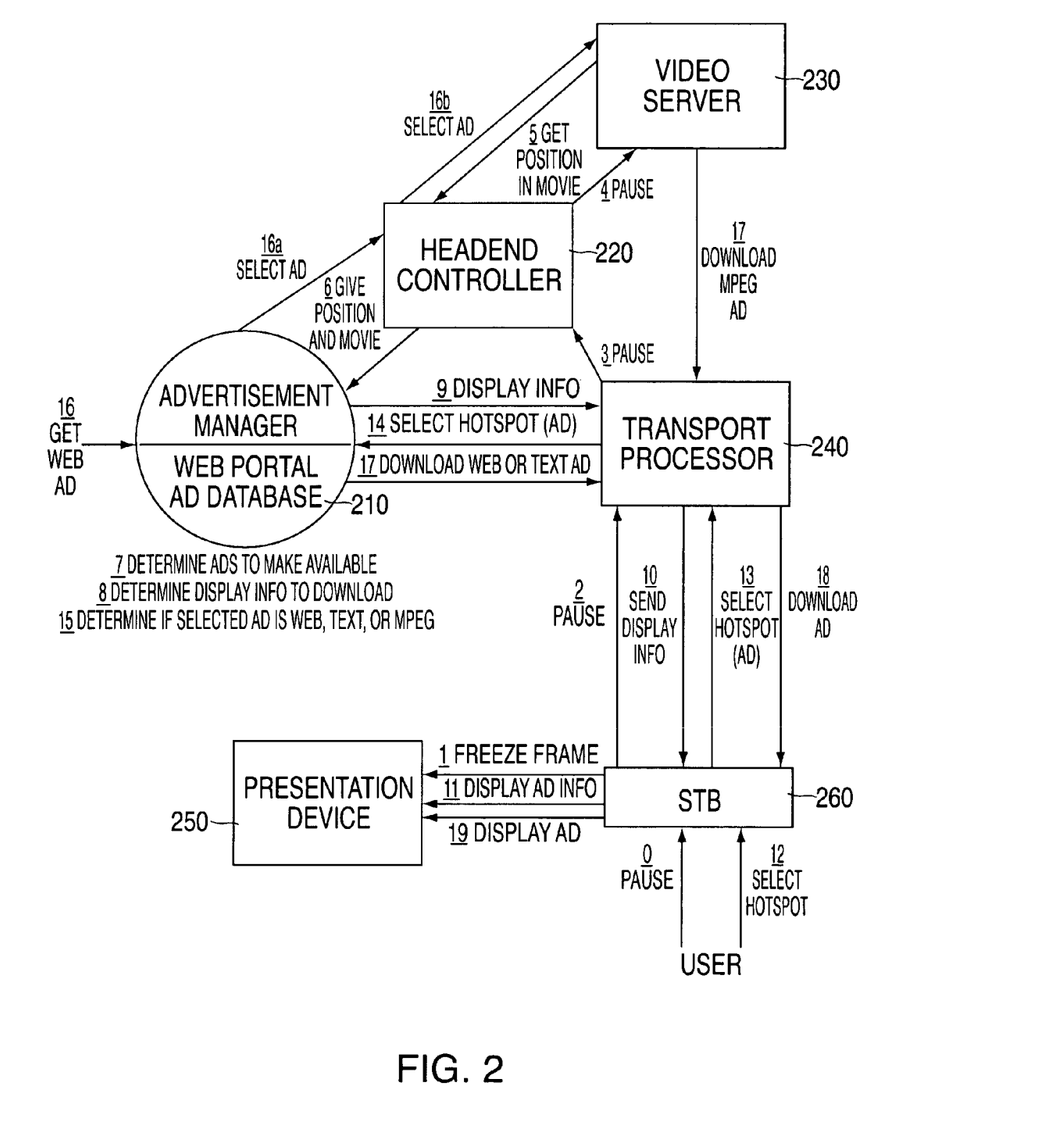
FIG. 2 depicts an interaction diagram useful in understanding the present invention.

FIG. 2 depicts an interaction diagram useful in understanding the present invention. Specifically, FIG. 2 depicts an interaction diagram depicting interactions between various entities forming a system that utilizes the present invention. The system is divided into information provider equipment and information subscriber or user equipment.

The information provider equipment depicted in FIG. 2 comprises a advertisement manager 210, illustratively a computer accessing information via the internet, a head end controller 220, a video server 230, and a digital link or transport processor 240. It should be noted that the head end controller 220, video server 230, transport processor 240 and advertisement manager 210 depicted in FIG. 2 function in substantially the same manner as the respective head end controller 124, video server 122, transport processor 126 and advertisement manager 128 depicted in FIG. 1. As such, differences between the various descriptions of the functional components are intended to address alternative embodiments of the invention.

The advertisement manager 210 comprises, illustratively, a computing device adapted to receive information via a network such as the internet and to disseminate the received information to either the head end controller 220 or the transport processor 240. The head end controller (HEC) 220 coordinates all of the information provider activities via control messages that are propagated throughout the system. The video server 230 stores content streams and other information streams that will be provided to a set top box associated with a user requesting the stored stream. The content streams comprise, illustratively, movies, music videos, television programs, video/audio advertisements and other content. The video server 230 operates in an interactive manner with a user requesting a content stream such that full VCR-like functionality is provided (e.g., play, stop, pause, fast forward and re-wind capability is provided to the user within the context of a video-on-demand environment). The digital link serves as an interface between the information provider equipment and the information distribution system used to provide information to, and receive commands from, a user. The information distribution system comprises, for example, a cable television distribution system.

At step 0, the user causes a "pause" command to be sent to the set top box 260 by, for example, pressing a "pause" key on a remote control device (not shown). At step 1, the set top box 260 receives the pause command and responsively causes the present video frame to be frozen. That is, the set top box causes the presentation device 250 to display a still image. The set top box 260 also propagates the pause command to the transport processor 240 via the communications network, illustratively the cable television distribution system.

At step 3, the transport processor 240 propagates the pause command to the head end controller 220. At step 4, the head end controller propagates the pause command to the video server 230. At step 5, the video server sends a "get position in movie" request to the head end controller 220. At step 6, the head end controller, after determining the present position of the movie being viewed by the user, provides to the advertisement manager 210 the position in the movie and the movie title or identifier. At step 7, the advertisement manager determines which ads to make available to the user. At step 8, the advertisement manager determines which display information to download. At step 9, the determined display information is provided to the transport processor 240. At step 10, the transport processor 240 sends the display information to the set top box 260. At step 11, the set top box 260 causes the ad information to be displayed by the presentation device 250. At step 12, the user selects, via a remote control device, a hot spot or link associated with the displayed ad information. At step 13, the selected hot spot or link is propagated from the set top box 260 to the transport processor 240 via the communications network. At step 14, the selected hot stop or advertisement link is propagated from the transport processor 240 to the advertisement manager 210. At step 15, the advertisement manager determines whether the selected ad is web based, text based, or streaming content based (i.e., MPEG-based). At step 16, if the selected ad is web based then the advertisement manager 210 retrieves the web based ad from a web site. At step 17, the retrieved or downloaded web ad or the text ad is provided to the transport processor 240. Alternatively, in the case of the selected ad comprising a video content or other content stored on the video server 230, that ad is provided to the transport processor 240 by the video server 230. At step 18, the retrieved or downloaded ad is provided by the transport processor 240 to the set top box 260 via the communications network. At step 19, the set top box 260 causes the downloaded ad to be displayed on the presentation device 250.

Figure 3:
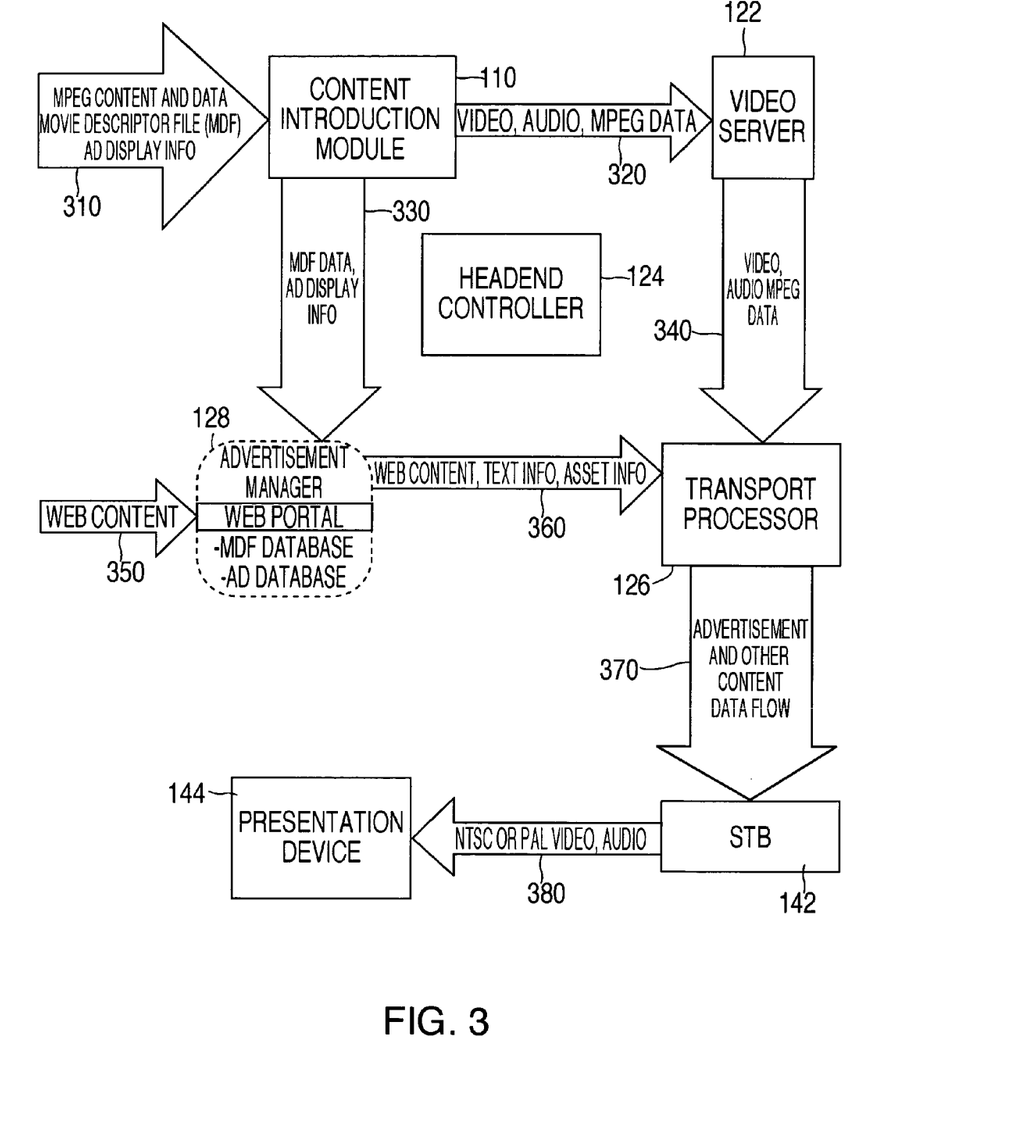
FIG. 3 depicts a logical diagram indicative of data flow within the information distribution system of FIG. 1.

FIG. 3 depicts a content data flow diagram used for understanding the present invention. Specifically, FIG. 3 depicts content data flow between the various elements of the head end 120 and subscriber equipment 140 previously described with respect to FIG. 1. It is noted that the contents may comprise advertisement content or non-advertisement content. Moreover, it is noted that there is no depiction within FIG. 3 of the back channel (BC) of the interactive information distribution system, though such back channel is present.

Referring now to FIG. 3, MPEG movies and advertisements, movie descriptor files (MDF) and advertised display information is coupled to the content introduction module 110 as indicated by data flow path 310.

MPEG content and advertisement comprise respective MPEG-compliant streams including compressed content streams (such as movies, television programs, sporting events and the like) or advertisement streams. A movie descriptor file (MDF) comprises a data file indicative of the goods and/or services used in each scene of the movie that are associated with advertisement streams, web links or other information that may be selected by a user.

All of the content that is stored within the video server 122 is first processed by the content introduction module 110. Thus, the content introduction module processes content such as movies, television shows and the like, advertisement imagery, movie description information and advertisement display information. All of the MPEG streams, such as video and audio streams associated with content or advertisement, are sent to the video server 122 for storage via path 320. The movie descriptor files and advertisement display information are coupled from the content introduction module 110 to the advertisement manager 128 via path 330. The advertisement manager 128 includes a movie descriptor file database and an advertisement display information database. The advertisement manager 128 also receives web content from the internet via data path 350.

The video server 122 couples the video and audio streams associated with requested content to the transport processor 126 via data path 340. The transport processor 126 in turn couples the requested content, and any other information, to the requesting set-top box 142 via data path 370. The set-top box 122 responsively produces output signals suitable for driving the presentation device 144, illustratively, NTSC or PAL video signals and associated audio signals which are coupled to the presentation device 144 via data path 380.

The presentation device 144 presents the imagery and associated audio information in a relatively standard manner in response to the information provided by the set-top box.

In the case of the set-top box 142 requesting an advertisement stream, the request for the advertisement stream is propagated from the set-top box 142 to the head end controller by the digital link. The requested advertisement stream is then provided from the video server 122 to the transport processor 126 via the data path 340, and from the transport processor 126 to the set-top box 142 via the data path 370. In response to the set-top box requesting web content, text information or other information, the request is processed by the head end controller and the web content, text information or other information is coupled from the advertisement manager 128 to the transport processor 126 via the data path 360, and from the transport processor 126 to the set-top box 142 via the data path 370. In this manner, compressed audio-visual information is stored on the video server 122, while associated web content, movie descriptor files and ad information is stored in the advertisement manager 128. As previously discussed, the advertisement manager 128 may comprise a computer including a mass storage device for storing the various data files and for accessing the internet to provide an interactive internet browsing experience to a set-top box requesting such a session.

Figure 4:
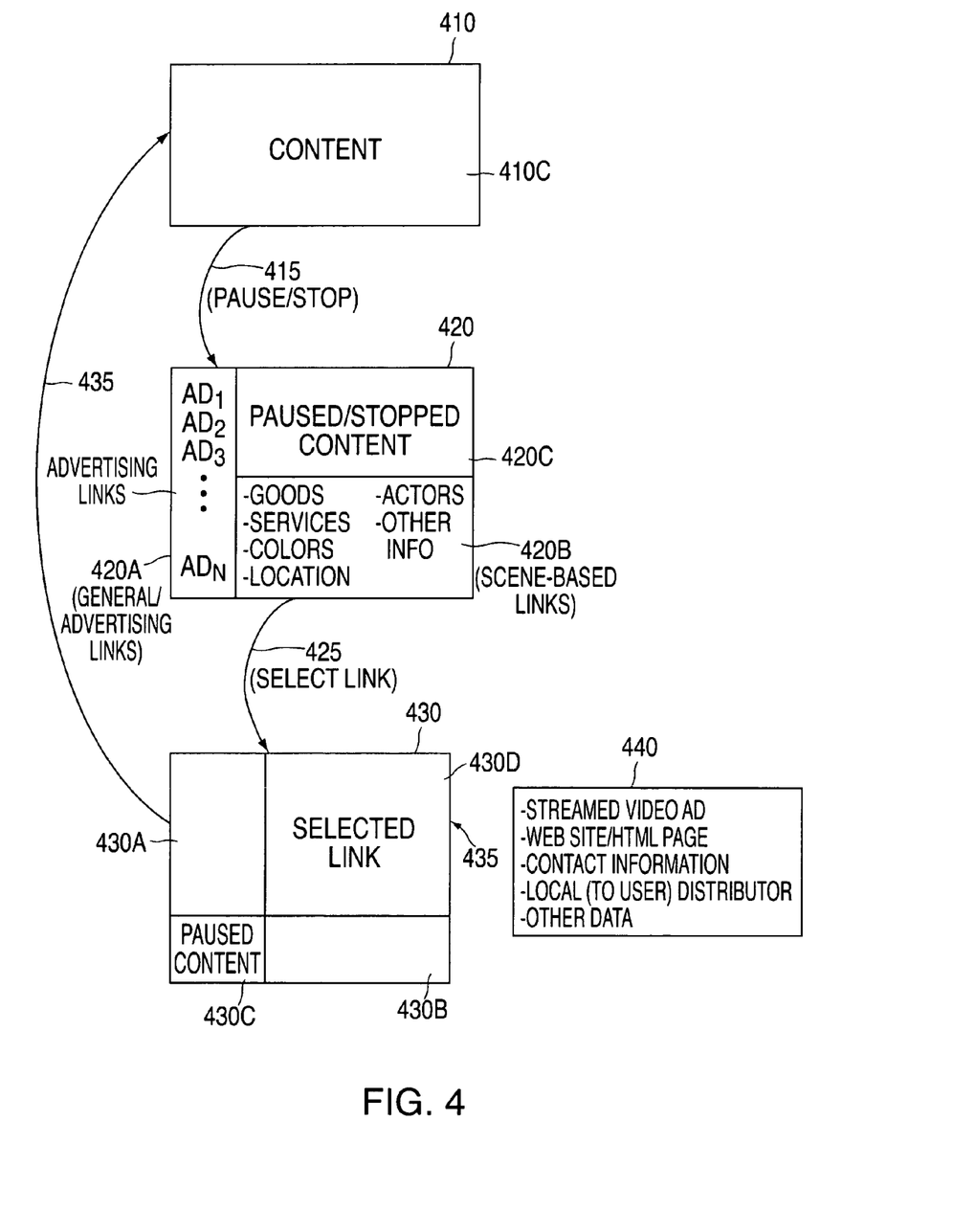
FIG. 4 depicts an exemplary display screen as modified according to the invention.

FIG. 4 depicts an exemplary display screen and modified by the invention. Specifically, a first display screen 410 includes a full screen representation of content 410(c). That is, the first display screen 410 comprises a standard display of the video imagery associated with content requested by the subscriber. In response to a pause or stop command 415, the set-top box changes the displayed screen from the screen of 410 to the screen of 420. The second display screen 420 comprises a content portion 420(c), a general advertisement portion 420(a) and a scene-based advertisement portion 420(b). The content portion 420(c) comprises a still image or frozen frame that has been decimated to be reduced in size. The general advertisement link portion of the display screen includes a plurality of links $AD_1$ through $AD_n$ (collectively links AD). Each of these advertisement links comprises a graphical object representing a link to a web page, a link to advertisement content stored on the video server 122, or a link to other information. Similarly, the scene-based link region 420(b) includes a plurality of objects providing links to goods and/or services that are associated with the presently-displayed scene of the requested content. That is, a movie or other audio-visual program is divided into a plurality of scenes, each of these scenes comprising a plurality of frames. The frozen frame displayed within the content region 420(c) is, therefore, associated with a particular scene. Within that scene, a plurality of goods and/or services are used, represented, placed or otherwise associated with the scene. These goods and/or services may comprise products being used by the actors, clothing worn by the actors, automobiles, vacation spots or locations that the scene is filmed in and other information. The scene-based links 420(b) comprise graphical objects that may be selected by the user to provide more information about at least those goods and/or services which have been associated with the scene as an auxiliary stream or by a movie description/advertisement display information file. As previously discussed, the advertisement provided to a subscriber may be based upon demographic data associated with the subscriber or the advertisement information associated with the scene within which the subscriber has stopped or paused the presentation of the requested content.

All of the general advertisement links $AD_1$ through $AD_n$ and the scene-based advertisement links comprise graphical objects and may be selected by a user manipulating a remote control device associated with the set-top box causing the second display 420 to be displayed on a presentation device. Upon selecting an object or link 425, the set-top box causes the presentation device to display the third display 430. The third display 430 comprises a further reduced content region 430(c), a general advertisement region 430(a), a scene-related advertisement region 430(b) and, in a relatively large region, a selected link display window 430(d). The information presented within the selected link window 430(d) may comprise, per box 440, a streamed video advertisement, a web site or HTML page from the internet, contact information associated with a selected advertisement link, contact information associated with the local distributor of the selected link (local with respect to the subscriber) and other data.

Upon the subscriber pressing the PLAY button 435, the first display window 410 is re-established and the requested content is again provided as streaming video to the subscriber for presentation.

It will be appreciated by those skilled in the art that the above-described iterations between display screens may be readily adapted to accommodate other configurations. Specifically, the above-described display regions have been arranged in a mosaic manner such that each region is distinct from an adjoining region. However, in one embodiment of the invention, the paused or stopped content region 420(c) comprises the entire display window and one or both of the general advertisement link region 420(a) and scene-based advertisement region 420(b) are superimposed or overlayed over the paused/stopped content 420(c). In another embodiment of the invention, only scene-based advertisement links are displayed.

In an important embodiment of the invention, "hot spots" within the displayed imagery are selectable by a user. Specifically, image regions including goods and/or services having associated with them additional information via respective scene-based links. The selection of a user of a particular hot spot is treated in the same manner as the selection of a scene-based link associated with goods and/or services associated with the imagery within that hot spot. The selection of such hot spots may be performed during still or moving imagery.

The above-described "hot spots" may comprise video layer or graphical layer imagery associated with particular goods and/or services shown within the displayed imagery, whether still or moving imagery. Alternatively, the "hot spots" may comprise web links or other advertisement related links displayed within or proximate to the still or moving imagery. In one embodiment of the invention, the still or moving imagery and any web links, whether content-related web links or general web links are included within a video stream provided to the information consumer. Thus, in this embodiment, the imagery described above with respect to FIG. 4 is primarily provided within a so-called video layer. A graphical layer may be used to selectively provide emphasis or de-emphasis of hot spots in response to user manipulations tending to indicate particular hot spots. An example of combined video layer and graphical layer information being used in this manner, along with control layer information, is described in more detail in U.S. patent application Ser. No. 08/984,427, filed on Dec. 3, 1997, entitled METHOD AND APPARATUS FOR PROVIDING A MENU STRUCTURE FOR AN INTERACTIVE INFORMATION DISTRIBUTION SYSTEM. This U.S. Patent Application discloses a means for providing a navigator function within an interactive information distribution system such as the DIVA System, and is incorporated herein by reference in its entirety. Specifically, this patent discloses methods and apparatus for combining a video layer, graphical layer, and control layer together as an applet and providing the applet to a subscriber in response to a subscriber interaction requesting the applet. Within the context of the present invention, the teachings of U.S. patent application Ser. No. 08/984,427 are applicable to the delivery of secondary content and/or the selection of such secondary content from a primary content stream. That is, given a primary content stream, or a secondary content stream, user interaction is interpreted by a control layer and associated with objects within a graphical layer such that video layer objects are responsively emphasized and/or de-emphasized within the video layer. In this manner, the subscriber may interactively select defined graphical/video objects within the received imagery, such as web links, hot spots indicative of goods and/or services within the primary content stream and other items. Other applications for these methods and apparatus to the present invention will be readily appreciated by those skilled in the art.

Figure 5:
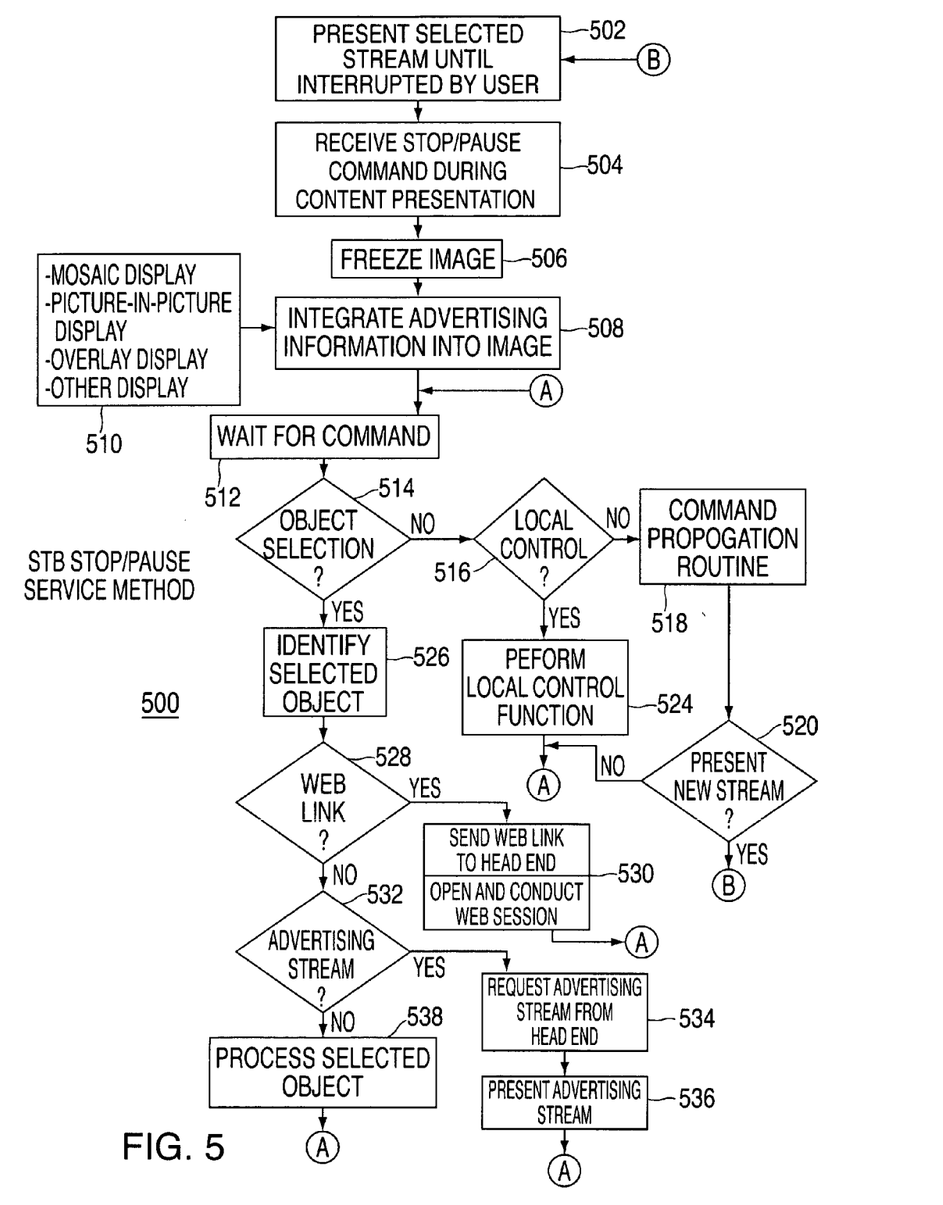
FIG. 5 depicts a flow diagram of a subscriber side method according to the invention.

FIG. 5 depicts a flow diagram of a subscriber side method according to the invention. The method 500 of FIG. 5 assumes that a session between the subscriber and the head end has been initiated and that the subscriber is presently viewing a selected content stream.

The method 500 of FIG. 5 is entered at step 502, where the selected content stream is presented until interrupted by the user. While such an interruption may comprise any of the VCR-like functions previously described, for purposes of this illustration, it will be assumed that the user interruption comprises one of a STOP command or a PAUSE command.

At step 504, the STOP or PAUSE command is received during the content presentation. The method 500 then proceeds to step 506, where a presently-displayed image is frozen. For example, in the case of the set-top box including a frame buffer (not shown), the contents of the frame buffer are not updated and are repeatedly provided to the presentation device, thereby effecting a "freezeframe" of the presently-viewed image frame. The method 500 then proceeds to step 508.

At step 508, advertisement information is integrated into the image presented via the display device. That is, advertisement information is integrated using one or more of the techniques depicted in box 510; namely, a mosaic display, a picture-in-picture (PIP) display, and overlay display or other display technique. A mosaic display comprises the display of a plurality of distinct image regions, each of the image regions including respective imagery. Thus, a mosaic display may show a first image region in which the frozen imagery from step 506 is displayed, while one or more other image regions may comprise advertisement or other information, such as previously described with respect to FIG. 4. It will be noted that in the case of a non-overlay display technique, the frozen image will typically be decimated such that the image resolution is reduced and, therefore, the amount of display area required to present the image is reduced. A picture-in-picture display comprises an inset image within a larger image. Thus, the advertisement information associated with the content stream may be displayed in an inset or auxiliary image within the frozen content imagery. An overlay display comprises the display of advertisement or other information within the same display area as the frozen content information. Such an overlay display may comprise still or moving imagery providing the appropriate advertisement information. After the advertisement information is integrated into the presented image, the method 500 proceeds to step 512 where it waits for a user command.

Upon receiving a user command, the method 500 proceeds to step 514 where a query is made as to whether an advertisement object has been selected. If the query is answered negatively, then the method 500 proceeds to step 516 where a query is made as to whether a local control function has been selected (e.g., audio control, picture control and the like). If a local control function has been selected, then the local control function is performed (step 524) and the method 500 proceeds to step 512 to wait for the next user command. If a local control function has not been selected, then the non-local command is propagated to the head end by the back channel BC for further processing (step 518). The method 500 then proceeds to step 520, where a query is made as to whether a new content stream or other stream is to be presented. If a new content stream or other stream is not to be presented, then the method 500 proceeds to step 512 to wait for the next user command. Otherwise, the method 500 exits, and in the case of the selection by the user of a new stream to be presented, the method proceeds to step 502 where the new stream is presented upon receipt by the set-top box.

If the query at step 514 indicates that an object has been selected, then the method 500 proceeds to step 526, where the selected object is identified. The method then proceeds to step 528, where a query is made as to whether the selected object comprises a web link. That is, at step 528, a query is made as to whether the selected object comprises an object associated with an HTML link or other network address indicative of the desire of a user to open an interactive web or internet session. If the query at step 528 is answered affirmatively, then the method 500 proceeds to step 530 where the selected web link is propagated to the head end and a web session is opened with the head end. The web session may comprise standard interaction between a user and a remote computer displaying goods and/or services associated with the selected object. The web session may be used to effect the purchase of such goods and/or services or simply provide additional information to the user. Upon the conclusion of the web session, the method 500 proceeds to step 512 to wait for the next user command. It is noted that the presentation device will be returned to a display including the frozen imagery and integrated advertisement. If the query at step 528 is answered negatively, then the method 500 proceeds to step 532.

At step 532, a query is made as to whether the selected object is associated with an advertisement stream stored on, for example, the video server in the head end. If the query at step 532 is answered affirmatively, then the method 500 proceeds to step 534 where a request for the advertisement stream is propagated from the set-top box to the head end via the back channel BC. The method 500 then proceeds to step 536, where the requested advertisement stream is presented to the user. Upon concluding the presentation of the requested advertisement stream, the method 500 proceeds to step 512 to wait for the next user command. If the query at step 532 is answered negatively, then the method 500 proceeds to step 538.

At step 538, the selected object is processed in the normal manner associated with that object. The method 500 then proceeds to step 512 to wait for the next user command.

Figure 6:
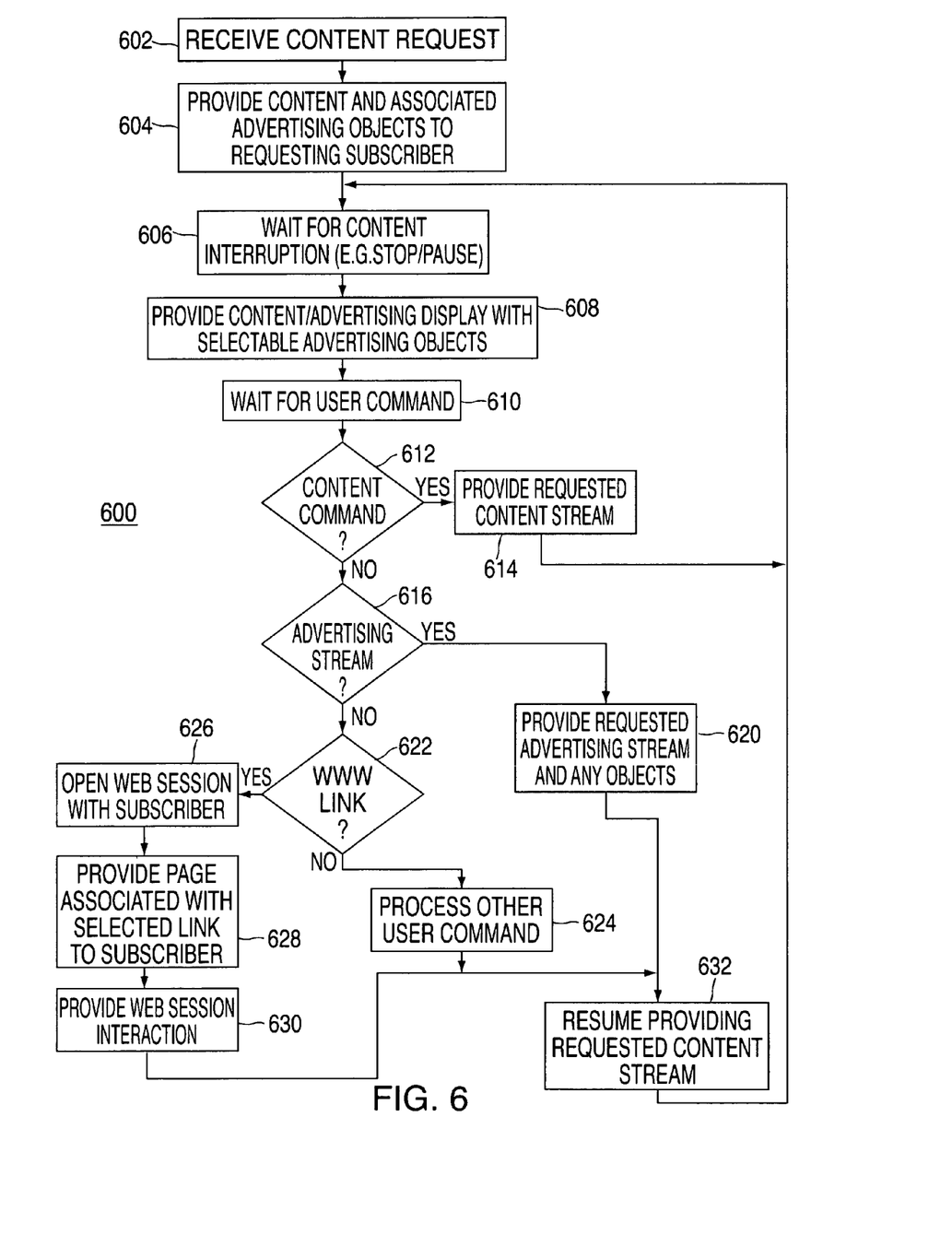
FIG. 6 depicts a flow diagram of a provider side method according to the invention.

FIG. 6 depicts a flow diagram of a provider side method according to the invention. The method 600 of FIG. 6 assumes that a session between the subscriber and the head end has been initiated.

The method 600 of FIG. 6 is entered at step 602, when a content request from a subscriber is received. The method 600 proceeds to step 604, where the requested content and any associated advertisement objects are provided to the requesting subscriber. The method 600 then proceeds to step 606.

At step 606, the provider equipment waits for an indication of content interruption from the subscriber (e.g., a stop or pause command). That is, the provider equipment continues to stream the requested content to the subscriber until a command is received from the subscriber via the back channel (BC) indicating that streaming should be stopped. After receiving a content interruption command, the method 600 proceeds to step 608.

At step 608, the advertisement objects associated with the provided content are displayed on the user's presentation device. That is, a display screen such as previously described with respect to FIG. 4 is presented on the user's display device.

The information to enable the advertisement display screen (i.e., the advertisement information) may be transmitted to the subscriber at this time or, alternatively, the information has previously been transmitted with the content stream and is stored within the subscriber equipment. In either case, upon the user interrupting the content stream, the selectable advertisement objects associated with that content stream are displayed upon the user's presentation device. These objects are either retrieved from a memory within the set top box or provided at this time by the provider equipment.

In one embodiment of the invention, the provider equipment provides a stream to the subscriber in which a window of still or moving imagery associated with the requested content stream is shown along with advertisement imagery including selectable graphical objects. In this embodiment of the invention, a user may continually view advertisement links for goods and/or services associated with the present scene displayed within the moving or still imagery window. The advertisement links may also comprise non-content related links.

After providing the content/advertisement display with selectable advertisement objects to the user (step 608), the method 600 proceeds to step 610 where it waits for a content stream interruption command from the user. Upon receiving such a command, the method 600 proceeds to step 612.

At step 612, a query is made as to whether the received user command comprises a content command. That is, at step 612 a query is made as to whether the received user command comprises a request for a different content stream or a modified content stream (e.g., a fast-play stream). If the query at step 612 is answered affirmatively, then the method proceeds to step 614 where the newly requested or modified content stream is provided to the user. The method 600 then proceeds to step 606 to wait for a content stream interruption command from the user. If the query at step 612 is answered negatively, then the method 600 proceeds to step 616.

At step 616, a query is made as to whether an advertisement stream request has been received from the user. That is, at step 616 a query is made as to whether the user has selected an advertisement object associated with the content stream providing advertisement information. If the query at step 616 is answered affirmatively, then the method 600 proceeds to step 620. If the query at step 616 is answered negatively, then the method 600 proceeds to step 622.

At step 620, the requested advertisement stream and any object associated with that advertisement stream are provided to the subscriber. After the advertisement stream is entirely presented to the subscriber, or the subscriber terminates the presentation of the advertisement stream, the method 600 proceeds to step 632.

At step 632, the provider equipment resumes providing the initially requested content stream where it was previously exited. That is, the initially provided content stream was exited at a point due to, for example, the need to provide an advertisement stream to the user at step 620. Upon concluding the presentation of an advertisement stream, the provider resumes providing the initially requested content stream at that exit point. The method 600 then proceeds to step 606, where it waits for a content interruption command from the user.

At step 622, a query is made as to whether the received user command comprises a world wide web (www) link or other command indicative of a desire to open a web session. If the query at step 622 is answered negatively (i.e., some other command has been received), then the method 600 proceeds to step 624 where the user command is processed in the normal manner associated with the received user command (e.g., a billing inquiry, scheduling request and the like). The method 600 then proceeds to step 632. If the query at step 622 is answered affirmatively, then the method 600 proceeds to step 626.

At step 626, a web session between the provider equipment and the subscriber is initiated, and the method 600 proceeds to step 628. At step 628, the HTML or other web page associated with the selected link is retrieved by the advertisement manager 128 from the internet 150 and provided to the subscriber via the transport processor 126. The method 600 then proceeds to step 630, where web session interaction is provided to the subscriber. That is, at step 630 the provider equipment 120 interacts with the subscriber equipment 140 to effect a web browsing or web surfing session in which the subscriber may interactively browse the world wide web. Upon the conclusion of the web session, such as when the subscriber has retrieved the advertisement information he was looking for, the method proceeds to step 632. At step 632, the provider equipment 120 resumes providing the requested content stream to the subscriber. The method 600 then proceeds to step 606 to wait for the next content interruption command from the subscriber.

Although various embodiments which incorporate the teachings of the present invention have been shown and described in detail herein, those skilled in the art can readily devise many other varied embodiments that still incorporate these teachings.

What is claimed is:

1. In an interactive information distribution system including information provider equipment and information consumer equipment, a method for user in an information server comprising the steps of:

provider a primary video-on-demand (VOD) content stream to an information consumer; and in response to a stop or pause command received from said information consumer, performing the steps of:

halting the providing of said primary VOD content stream to said information consumer and providing a secondary content to said information consumer; wherein said secondary content provided to said information consumer is provided as an applet comprising a video layer, a control layer and a graphics layer, said video layer providing at least imagery associated with said secondary content, said control layer enabling said graphics layer to be used for selectively emphasizing and de-emphasizing portions of said video layer imagery, said selective emphasizing and de-emphasizing occurring in response to user interaction.

2. The method of claim 1, further comprising the step of:
restarting the providing of said primary VOD content stream to said information consumer in response to a play or resume command received from said information consumer.

3. The method of claim 1, wherein said secondary content provided to said information consumer is determined with respect to a demographic profile associated with said information consumer.

4. The method of claim 1, wherein said secondary content provided to said information consumer is determined with respect to a segment of said primary VOD content stream being presented to said information consumer contemporaneous to said stop or pause command.

5. The method of claim 4, wherein said secondary content provided to said information consumer is additionally determined with respect to a demographic profile associated with said information consumer.

6. The method of claim 1, further comprising the steps of:
determining, for said halted VOD content stream, the last scene of said primary VOD content stream provided to said information consumer; and selecting secondary content associated with said determined scene, said determined scene being associated with at least one secondary content stream, said selected secondary content stream being provided to said information consumer in response to said received stop or pause command.

7. The method of claim 1, wherein said secondary content comprises advertising content.

8. The method of claim 7, wherein said secondary content provided to said information consumer is determined with respect to one of a demographic profile associated with said information consumer and the segment of said content stream being presented to said information consumer contemporaneous to said stop or pause command.

* * * * *

UNITED STATES PATENT AND TRADEMARK OFFICE
CERTIFICATE OF CORRECTION

PATENT NO. : 7,017,173 B1  
APPLICATION NO. : 09/538816  
DATED : March 21, 2006  
INVENTOR(S) : James B. Armstrong et al.

It is certified that error appears in the above-identified patent and that said Letters Patent is hereby corrected as shown below:

Column 14, line 56, change "user" to --use--.

Signed and Sealed this

Eighteenth Day of July, 2006

JON W. DUDAS  
*Director of the United States Patent and Trademark Office*